(12) United States Patent
Haggander

(10) Patent No.: US 7,302,794 B2
(45) Date of Patent: Dec. 4, 2007

(54) ROCKET ENGINE MEMBER AND A METHOD FOR MANUFACTURING A ROCKET ENGINE MEMBER

(75) Inventor: Jan Haggander, Trollhattan (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

(21) Appl. No.: 10/604,333

(22) Filed: Jul. 11, 2003

(65) Prior Publication Data

US 2004/0103639 A1  Jun. 3, 2004

Related U.S. Application Data

(63) Continuation of application No. PCT/SE02/00027, filed on Jan. 9, 2002, now abandoned.

(60) Provisional application No. 60/261,050, filed on Jan. 11, 2001.

(30) Foreign Application Priority Data

Jan. 11, 2001   (SE)   .................................. 0100075

(51) Int. Cl.
- *F02K 11/00* (2006.01)
- *B21D 53/00* (2006.01)
- *B64D 33/04* (2006.01)

(52) U.S. Cl. .................. 60/267; 29/890.01; 239/127.1
(58) Field of Classification Search ................. 60/266, 60/267; 29/890.01, 890.142; 239/127.1, 239/127.3
See application file for complete search history.

(56) References Cited

U.S. PATENT DOCUMENTS

| | | | | |
|---|---|---|---|---|
| 4,485,866 A | * | 12/1984 | Hemmerich et al. | 165/90 |
| 4,781,019 A | * | 11/1988 | Wagner | 60/260 |
| 6,591,499 B1 | * | 7/2003 | Lundgren | 29/890.01 |
| 6,637,188 B2 | * | 10/2003 | Bichler et al. | 60/257 |

FOREIGN PATENT DOCUMENTS

| | | |
|---|---|---|
| EP | 0530721 A1 | 3/1993 |
| GB | 904887 A | 9/1962 |
| SU | 2061890 | 6/1996 |

* cited by examiner

*Primary Examiner*—Charles G Freay
(74) *Attorney, Agent, or Firm*—Novak Druce & Quigg, LLP

(57) ABSTRACT

Method and arrangement for providing a liquid fuel rocket engine member having a load bearing wall structure (11,14) including a plurality of cooling channels (11) for handling a coolant flow. Each cooling channel (11) is provided with a flow guiding surface (15) extending at an angle to the cooling channel axis, for providing the axial coolant flow with an added flow component in the radial direction.

18 Claims, 3 Drawing Sheets

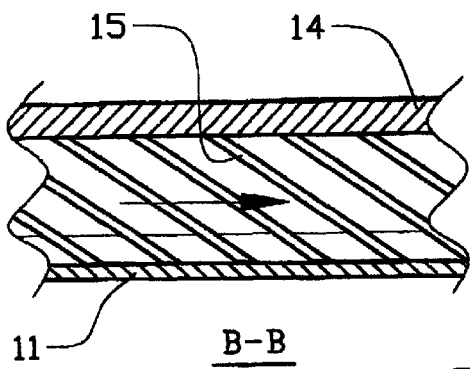
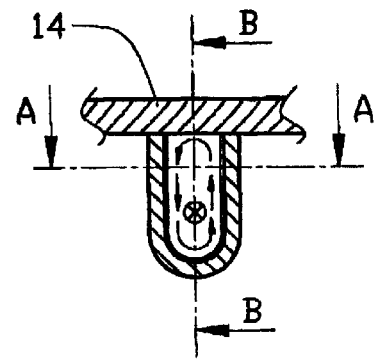
Fig.2  Fig.3
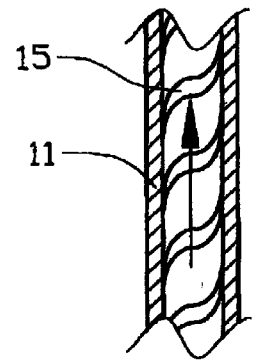
Fig.4
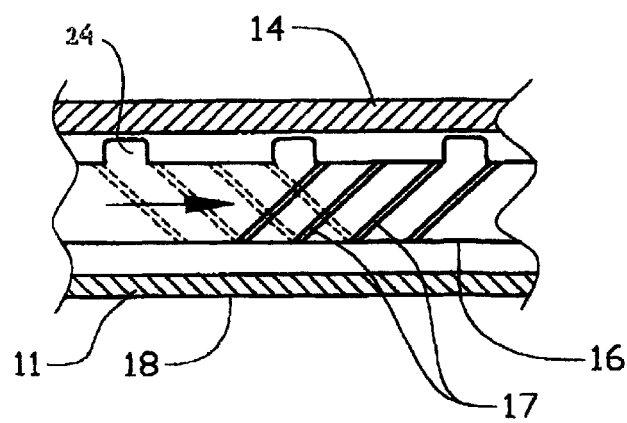
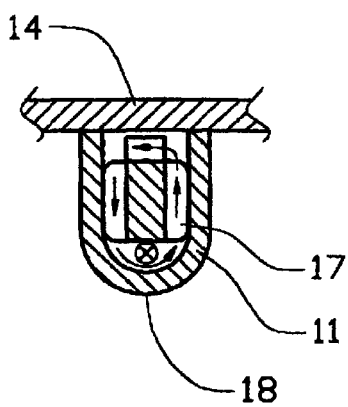
Fig.5  Fig.6

ROCKET ENGINE MEMBER AND A METHOD FOR MANUFACTURING A ROCKET ENGINE MEMBER

CROSS REFERENCE TO RELATED APPLICATIONS

This application is a continuation patent application of International Application No. PCT/SE02/00027 filed 9 Jan. 2002 now abandoned which was published in English pursuant to Article 21(2) of the Patent Cooperation Treaty, and which claims priority to Swedish Application No. 0100075-1 filed 11 Jan. 2001 and to U.S. Provisional Application No. 60/261,050 filed 11 Jan. 2001. Said applications are expressly incorporated herein by reference in their entireties.

TECHNICAL FIELD

The present invention relates to a liquid fuel rocket engine member having a load bearing wall structure having a plurality of cooling channels for handling a coolant flow. The invention also relates to a method for manufacturing such a rocket engine member.

BACKGROUND OF THE INVENTION

During operation, the heat load is very intense inside a rocket combustion chamber. The walls of the combustion chamber must be cooled efficiently to prevent melting, or in other ways damaging or destroying the structure. The most common way to cool the chamber wall is by convection cooling. Accordingly, cool fuel, and even oxidizer is used in the cooling process.

The service life of such chambers is often a problem. Much care must be taken to ensure proper function. Inspection and repair during development and use of the engines is costly. The service life very much depends on the temperature level of the wall structure closest to the flame. The temperature gradient over the cooling channels generates thermal stress. The elevated temperatures degrade the material properties. Therefore, the service life is strongly influenced by the temperature. Reduction of the temperature by 100° F. leads to about three times increase in service life and 10 times increase in creep life.

The intense heat load leads to stratification of the coolant. The coolant closest to the hot wall is heated which results in a temperature increase. The viscosity of the coolant is lowered leading to increased flow speed closest to the heated wall. Thus, the coolant is stratified with sharp temperature gradients. A large portion of the coolant is only heated to a low temperature level, reducing the efficiency of the cooling system. The temperature difference in the coolant may be in the order of 600-700° F. At the outer side of the cooling channel, near the outlet end, the coolant may still have the inlet temperature of 60° F.

It has been proposed to enlarge the cooling surface of the cooling wall, for example by having longitudinal fins along the inside the channels, however, the fins need to have some height to penetrate the thermal boundary layer. The coolant flow speed will be slowed down in the gap between the fins in case they are made high and close together. Therefore, the increase in heat transfer is limited with this measure. Also, the bottom of each fin needs to be sharp to give room for a large number of fins. The sharp bottom is perpendicular to the first principle stress. The channel bottom represents an important stress concentration. The fins are delicate to manufacture. The width of the channels at the throat area is in the order of 1.0 mm, which means that the maximum width of one of three fins is 0.3 mm and the tip of the fin becomes infinitely thin.

Also, it has been proposed to make heat transfer more effective by increasing the channel wall surface roughness to generate turbulence in the coolant flow. The surface roughness increases the vortexes at the wall, but the effect is small with a very low viscosity fluent as hydrogen.

JP 60048127 teaches the use of a twisted steel band inside a horizontal cooling channel to force a secondary flow to avoid stratification. This method is proposed for application in nuclear plants at horizontal pipes in reactors, intermediate pumps, heat exchangers and inlet nozzles of steam generators. The steel band may lead to hot spots at the hot side and overheating of the material due to a reduced flow of coolant in the channel.

SUMMARY OF INVENTION

An object of the present invention is to provide a rocket engine member with a reduced stratification of the coolant inside the cooling channels.

This is achieved by providing each cooling channel with a flow guiding surface extending at an angle to the cooling channel axis for inducing in the axial coolant flow an added radial directional flow component. The flow guiding surface forces the coolant to rotate as it flows through the channel so that stratification is avoided.

The method according to the invention is characterized by the steps of shaping a sheet metal surface to provide a flow guiding surface, folding the sheet metal into cooling channels, and attaching the cooling channels to the wall structure.

Advantageous embodiments of the invention can be derived from the following claims.

BRIEF DESCRIPTION OF DRAWINGS

The invention will be further described in the following, in a non-limiting way with reference to the accompanying drawings in which:

FIG. 2 shows, in a larger scale, a longitudinal section through a cooling channel of the combustion chamber shown in FIG. 1, according to a first embodiment of the invention;

FIG. 3 is a cross section of a cooling channel as shown in FIGS. 1 and 2;

FIG. 4 is a section along the line 4-4 in FIG. 3;

FIG. 5 is a section corresponding to FIG. 2, according to a second embodiment of the invention;

FIG. 6 is a cross-sectional view of the cooling channel as indicated in FIG. 5;

FIG. 9 and FIG. 10 illustrate an example of the manufacturing of each of the channel structures, wherein FIG. 9 shows a machined, unfolded sheet and FIG. 10 shows the sheet of FIG. 9 in a folded state, forming a part of a cooling channel.

DETAILED DESCRIPTION

Figure 1:
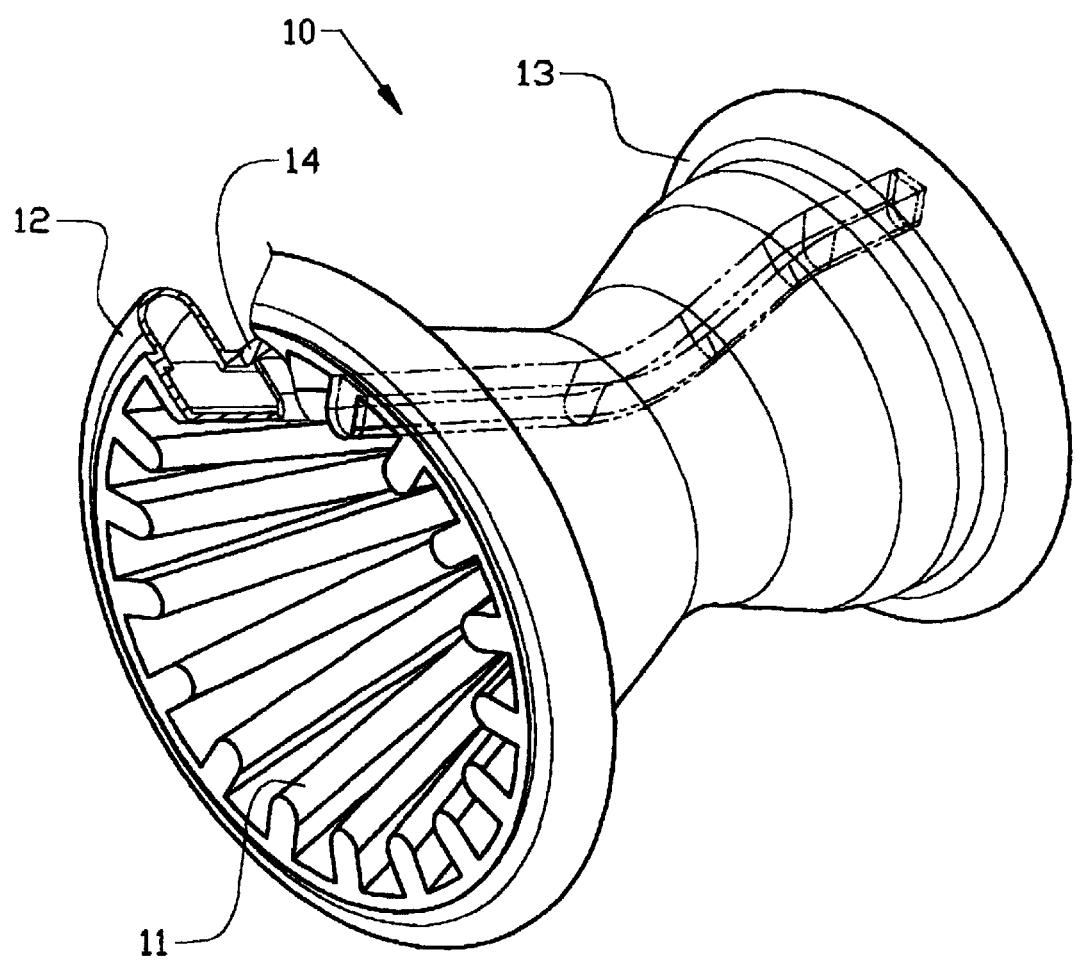
FIG. 1 is a schematic perspective, partial cutaway view of a rocket combustion chamber configured according to the invention.

FIG. 1 shows a diagrammatic and somewhat simplified side view of a rocket engine combustion chamber 10 that has been produced in accordance with the present invention. The combustion chamber is intended for use in rocket engines of the type using liquid fuel, for example liquid hydrogen. The working of such a rocket engine is previously known, per se, and is therefore not described in detail. The combustion chamber 10 is cooled with the aid of a cooling medium that is preferably also used as fuel in the particular rocket engine. The invention is, however, not limited to combustion chambers of this type.

The combustion chamber 10 is manufactured with an outer shape that forms a body of revolution having an axis of revolution and a cross section that varies in diameter along said axis.

The combustion chamber wall is a structure comprising a plurality of mutually adjacent cooling channels 11 extending substantially in parallel to the longitudinal axis of the combustion chamber 10 from the inlet end manifold 12 to its outlet end manifold 13. The outside of the structure includes a one piece pressure jacket 14. The U-formed cooling channels 11 are curved in the longitudinal direction to conform to the jacket contour along which are axially oriented and jointed by brazing.

In the embodiment as depicted in FIGS. 2-4, each cooling channel 11 has an internal flow guiding surface comprising a plurality of protruding ribs 15 extending at an angle to the axis of the cooling channel. The angle of the ribs will force the coolant to rotate inside the channel as the coolant flows along the channel. In this way unheated coolant will be transported from the outside of the channel to the inside and heated coolant will be transported from the inside of the channel to the outside.

FIG. 3 shows a cross section of one of the channels configured according to FIG. 1. FIG. 2 illustrates a longitudinal section (a cut side view) of the channel taken along the line 2-2 in FIG. 3. FIG. 4 shows a longitudinal section (a cut view from above) of the channel along the line 4-4 in FIG. 3.

The flow guiding surface extends at an angle to the cooling channel axis, said angle differs from 0° and 90° in relation to the cooling channel axis. This angle preferably measures between 1° and 50°, more preferably between 5° and 30° and most particularly between 10° and 20° in relation to the cooling channel axis.

It will be possible to reduce the temperature of the combustion chamber by 100° F. by replacing about 15% of the already heated coolant with unheated coolant. The radial flow speed of the coolant should then be around 15% of its axial speed. This requires an angle of nine degrees from the axial speed vector. This small angle imposes only a small pressure drop to the coolant flow.

The ribbed channel surface increases the small vortexes and the friction at the hot side, also contributing to an increased heat transfer. Instead of the ribbed surface of FIGS. 2-4, the surface may be provided with grooves in the channel wall. The topology should be rather smooth at the hot side of the channel where the service life limiting location in order to reduce stress concentrations.

FIGS. 5 and 6 show a second embodiment of the invention in which the flow guiding surfaces are provided in the channel by means of a separate insert structure 16 having a central core, or body, with external thread portions 17. The structure 16 is adapted to be firmly fixed in the channel. The insert structure 16 is therefor provided with means 24 for maintaining a distance between the channel wall 14 and the central core. This distance holding means are exemplarily here formed by radially projecting portions arranged at mutual distances in the longitudinal direction of the channel. As there are no thread portions 17 at the inner side of the channel wall 18, the insert does not block the coolant from access to the hot wall.

Figure 7:
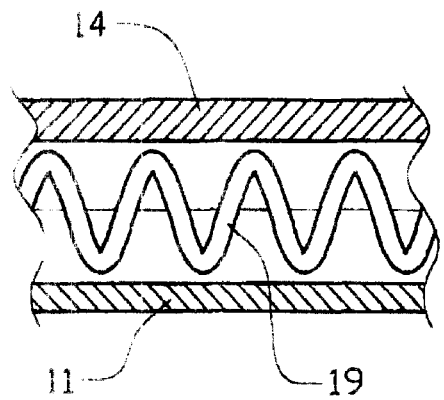
FIG. 7 is a section corresponding to FIG. 2, but configured according to a third embodiment of the invention.
Figure 8:
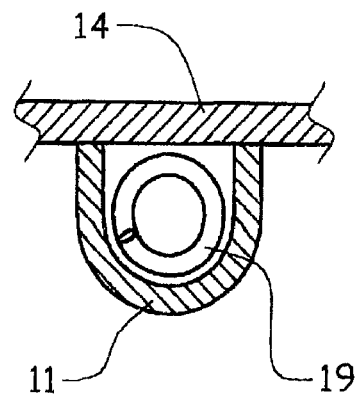
FIG. 8 is a cross-sectional view of the cooling channel as indicated in FIG. 7.

FIGS. 7 and 8 show a third embodiment of the invention. As an alternative to the insert 16 shown in FIGS. 5 and 6, the insert of this embodiment is formed by a helical spiral 19 that is without a central core. The helical spiral 19, or spring, extends along the shape of an imaginary circular cylinder and is arranged in contact with at least a part of the inner channel wall.

The channels 11 may have a smaller cross section at the inlet manifold 12 than at the outlet manifold 13. Further, the width of a channel element in the circumferential direction of the rocket engine member may vary along the length of the channel element. Preferably, the width of the channel elements are chosen so that the channel elements are arranged in contact with each other, ie with no mutual spacings, in the circumferential direction in a combustion chamber portion of the rocket engine member. On the other hand, the channel elements may have such width and be arranged in such a way that mutual spacings exist in the circumferential direction in a gas expansion portion of the rocket engine member. Preferably, separate cooling channel elements are stamped to present the desired ribbed or grooved surface structure. These elements are folded to the desired tapering channel width. Finally the separate channels are mounted into the rotational symmetric chamber and brazed. Thus, the manufacture of jacket and manifolds is simplified.

Figure 9:
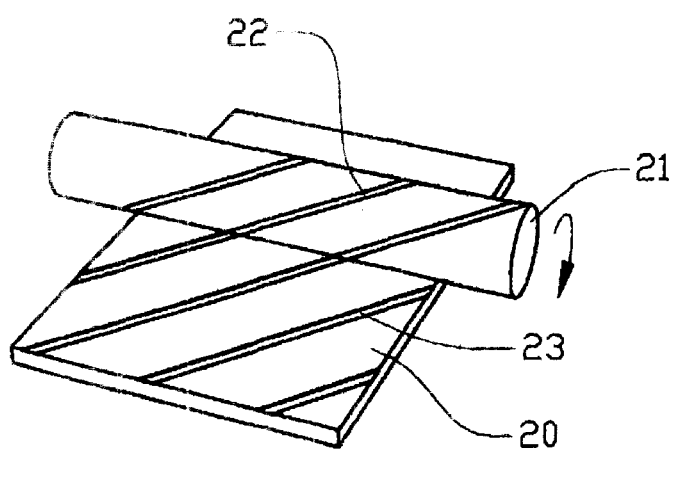
Figure 10:
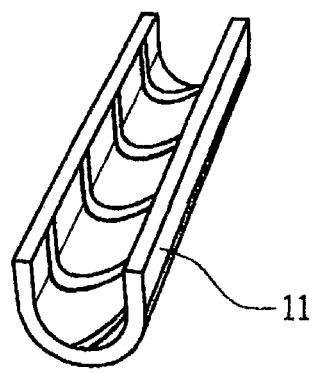

The method for manufacturing the rocket engine member is described below with reference to FIGS. 9 and 10 according to one example. In FIG. 9, a sheet metal is shown in the form of a plate 20. One side of the plate is machined in such a way that the surface shows ribs and/or grooves. In FIG. 9, the sheet metal 20 is rolled by means of rotating and pressing a cylinder 21 against the plate. In this case, the cylinder is provided with helical ribs 22 on its outer surface. By said rolling process, the helical ribs 22 form diagonal grooves 23 in the sheet metal 20. Thereafter, the sheet is folded, or shaped, in such a way that it forms a part of a cooling channel, see FIG. 10. A plurality of such folded sheets are thereafter connected to a wall 14.

As an alternative, the surface structure may be applied to channels with parallel sides. This could be done by removal of material, for example, by means of electro discharge machining.

The invention is not limited to the above-described embodiments, but several modifications are possible within the scope of the following claims. For example, the improved cold wall structure may also be applied to external expansion rocket engines like round and linear aero-spike engines. The flow guiding surface does not have to extend along the entire length of the cooling channel. Thus, the flow guiding surface can be applied to a part of the cooling channel subjected to the highest thermal load, for example, at the throat region. Further, the angle of the flow guiding surface in relation to the cooling channel axis may change along the length of the cooling channel. As an example, the angle is reduced from the inlet end of the channel to the outlet end of the channel.

The cooling channel can have a cross section shape which differs from the U-shape, such as a circular or rectangular cross-sectional shape.

The invention is not limited to the embodiments shown where a plurality of cooling channels are attached to a continuous metal sheet in order to form the wall structure. Instead, the cooling channels may be attached sideways to each other, forming a load bearing wall structure on their own. The connection of the walls of the cooling channels to each other can be performed by welding.

Further, the flow guiding surface may be applied to the sheet metal surface in other ways than by rolling, such as by stamping.

Further, the distance holding means on the central core of the embodiment shown in FIG. 5 may instead be formed by the described external thread portions.

Further, the rocket engine member may substantially only form the combustion chamber, a nozzle for expansion of the hot gases, or an element which is intended for both functions.

The invention claimed is:

1. A liquid fuel rocket engine member (10) comprising: a load bearing wall structure (11, 14) comprising a plurality of cooling channels (11) for handling a coolant flow, wherein the load bearing wall structure (11,14) comprises a curved wall (14), and wherein a wall of each of said cooling channels is attached to said curved wall; and each of the cooling channels (11) having a flow guiding surface (15,16, 17,19) extending along substantially the entire length of the cooling channel at an angle of between 1° and 50° to the cooling channel axis and thereby providing the axial coolant flow with an added radial directional flow component.

2. The liquid fuel rocket engine member as recited in claim 1, further comprising:
the flow guiding surface (16,17,19) comprising a separate structure inside the cooling channel (11).

3. The liquid fuel rocket engine member as recited in claim 1 wherein said angle is between 10° and 20°.

4. A liquid fuel rocket engine member (10) comprising: a load bearing wall structure (11, 14) comprising a plurality of cooling channels (11) for handling a coolant flow, wherein the load bearing wall structure (11,14) comprises a curved wall (14), and wherein a wall of each of said cooling channels is attached to said curved wall; and each of the cooling channels (11) having a flow guiding surface (15,16, 17,19) extending at an angle to the cooling channel axis and thereby providing the axial coolant flow with an added radial directional flow component, wherein the flow guiding surface (15) is incorporated into the channel wall (18).

5. The liquid fuel rocket engine member as recited in claim 4, further comprising: the flow guiding surface comprising a plurality of grooves in the channel wall (18).

6. The liquid fuel rocket engine member as recited in claim 4, further comprising: the flow guiding surface (15) comprising a plurality of ribs protruding (15) from the channel wall (18).

7. A liquid fuel rocket engine member (10) comprising: a load bearing wall structure (11, 14) comprising a plurality of cooling channels (11) for handling a coolant flow, wherein the load bearing wall structure (11,14) comprises a curved wall (14), and wherein a wall of each of said cooling channels is attached to said curved wall; and each of the cooling channels (11) having a flow guiding surface (15,16, 17,19) extending at an angle to the cooling channel axis and thereby providing the axial coolant flow with an added radial directional flow component, said flow guiding surface (16, 17,19) comprising a separate structure inside the cooling channel (11) and said separate structure comprising a helical spiral (19).

8. A liquid fuel rocket engine member (10) comprising: a load bearing wall structure (11, 14) comprising a plurality of cooling channels (11) for handling a coolant flow, wherein the load bearing wall structure (11,14) comprises a curved wall (14), and wherein a wall of each of said cooling channels is attached to said curved wall; and each of the cooling channels (11) having a flow guiding surface (15,16, 17,19) extending at an angle to the cooling channel axis and thereby providing the axial coolant flow with an added radial directional flow component, said flow guiding surface (16, 17,19) comprising a separate structure inside the cooling channel (11) and said separate structure having a threaded screw (16, 17).

9. A method for manufacturing a liquid fuel rocket engine member (10) having a load bearing wall structure (11, 14) comprising a plurality of cooling channels (11) for handling a coolant flow, said method comprising:
shaping a sheet metal surface to provide a flow guiding surface (15);
folding the sheet metal into cooling channels (11); and
forming said wall structure by at least said folded sheet metals by attaching said folded sheet metals to a wall (14) and thereby forming said wall structure.

10. The method as recited in claim 9, further comprising: shaping the sheet metal surface by stamping grooves into the surface.

11. The method as recited in claim 9, further comprising: shaping the sheet metal surface by stamping to form protruding ribs (15) on the surface.

12. A liquid fuel rocket engine member (10) comprising: a load bearing wall structure (11, 14) comprising a plurality of cooling channels (11) for handling a coolant flow, wherein the load bearing wall structure (11,14) comprises a curved wall (14), and wherein a wall of each of said cooling channels is attached to said curved wall; and each of the cooling channels (11) having a flow guiding surface (15,16, 17,19) extending along substantially the entire length of the cooling channel at an angle to the cooling channel axis and thereby providing the axial coolant flow with an added radial directional flow component.

13. The liquid fuel rocket engine member as recited in claim 12, further comprising: the flow guiding surface (15) being incorporated into the channel wall (18).

14. The liquid fuel rocket engine member as recited in claim 13, further comprising: the flow guiding surface comprising a plurality of grooves in the channel wall (18).

15. The liquid fuel rocket engine member as recited in claim 13, further comprising: the flow guiding surface (15) comprising a plurality of ribs protruding (15) from the channel wall (18).

16. The liquid fuel rocket engine member as recited in claim 12, further comprising: the flow guiding surface (16,17,19) comprising a separate structure inside the cooling channel (11).

17. The liquid fuel rocket engine member as recited in claim 16, further comprising: the structure comprising a helical spiral (19).

18. The liquid fuel rocket engine member as recited in claim 16, further comprising: the structure having a threaded screw (16, 17).

* * * * *